United States Patent [19]
Fujii et al.

[11] 3,853,705
[45] Dec. 10, 1974

[54] ENZYMATIC PRODUCTION OF CEPHALOTHIN

[75] Inventors: Tadashiro Fujii; Yuzo Shibuya, both of Yoshida, Shizuoka-ken, Japan

[73] Assignee: Toyo Jozo Kabushiki Kaisha, Shizuoka-ken, Japan

[22] Filed: Aug. 14, 1973

[21] Appl. No.: 388,150

[30] Foreign Application Priority Data
Aug. 22, 1972   Japan.............................. 47-84280

[52] U.S. Cl............ 195/30, 195/36 R, 195/DIG. 11
[51] Int. Cl................................................ C12d 9/00

[58] Field of Search............................ 195/36 R, 30

[56] References Cited
UNITED STATES PATENTS
3,761,354   9/1973   Abe et al............................. 195/30

Primary Examiner—Alvin E. Tanenholtz
Attorney, Agent, or Firm—Young & Thompson

[57] ABSTRACT

Cephlothin is produced from 7-amino cephalosporanic acid and thienylacetic acid ester by enzymatic acylation with acylating enzyme derived from a microorganism belonging to genus Bacillus.

6 Claims, No Drawings

ENZYMATIC PRODUCTION OF CEPHALOTHIN

This invention relates to a process for production of cephalothin, that is, 7-(2-thienyl acetamide)-cephalosporanic acid, by enzymatic acylation of 7-amino cephalosporanic acid (hereinafter designated 7-ACA). More particularly this invention relates to the enzymatic process for production of cephlothin in which 7-ACA is reacted with thienyl acetic acid or a derivative thereof in the presence of the acylating enzyme preparation derived from a microorganism strain, which produces an amino group acylating enzyme for 7-ACA, belonging to genus Bacillus in an aqueous medium. The acylating enzyme preparations hereinafter referred to include cultured broth, enzyme extracts, solid phase enzyme preparations or insoluble enzyme preparations, or the like.

Heretofore, cephalothin has been produced by the processes of acylation of 7-ACA by thenyl acetic acid (British Pat. No. 982,252; U.S. Pat. No. 3,252,973; British Pat. No. 1,206,626; U.S. Pat. No. 3,536,698).

These prior art methods have, however, disadvantages. For example, the chemical acylation of 7-ACA causes unavoidable pollution problems such as air pollution, stinks or waste water pollution.

The present inventors have found that when the enzyme preparation derived from Bacillus megaterium B-400 NRRL B-5385 is used for the purpose of the acylating process for producing cephalotin from 7-ACA, a protection of stinks and waste water treatment are easilly achieved.

Therefore, it is an object of the present invention to provide an enzymatic process for the production of chemotherapeutically useful cephalothin from 7-ACA.

Another object of the present invention is to provide an industrially attractive process for the production of cephalothin, without causing a stinks and an air pollution.

A further object of the present invention is to provide a process for the production of cephalothin using a solid phase enzyme preparation.

We have found, upon searching for a acylation enzyme producing bacteria which introduce a thienyl acetyl acid group to an amino group in 7-ACA, microorganisms belonging to genus Bacillus has shown a strong acylating activity for amino group in 7-ACA and cephalothin was almost quantitatively produced from 7-ACA and thienyl acetic acid ester.

In order to introduce a thienyl acetyl group into an amino group in 7-ACA, thienyl acetic acid or a derivative thereof is used.

Examples of the said derivatives are 2-thienyl acetic acid methyl ester, 2-thienyl acetic acid ethyl ester or the like.

The acylation enzyme-producing microorganism used in the present invention can be prepared by aerobic cultivation with a nutrient medium containing organic or inroganic nitrogen sources such as peptone, meat extract, corn steep liquor, yeast extract, dry yeast, nitrate, ammonium salt or the like, a carbon source such as molasses, glucose, starch hydrolysate or the like and inorganic salts, and if desired other suitable growth stimulating substances, at 25° – 37°C., for 12 – 60 hours. For industrial production, submerged aerobic cultivation is generally used.

The acylating enzyme for the amino group in 7-ACA may generally be present as an exo-enzyme. As for the enzyme preparations microbial cultures, culture filtrate or enzyme prepared therefrom may be used in the enzyme reaction.

Furthermore, culture filtrate treated by chemical or physical procedures, for example, refined enzymes obtained by known separation and refining procedures such as salting-out, fractionation precipitation, dialysis, adsorption chromatography, ion-exchange chromatography or gel-filtration of culture filtrate; and the solid phase enzyme preparations or the insoublized enzymes prepared from adsorption of the acylation enzyme on an inert carrier, which is not inactive for substrates and do not inactivate the said acylating enzyme, can be used for the process of the present invention, insofar as the acylating enzyme activity is maintained.

The acylation process takes place by the reaction of 7-ACA with thienyl acetic acid or with a derivative thereof, in the presence of acylating enzyme preparations. There is generally used free, acidic 7-ACA in a concentration of 0.1 – 20 mg./ml. and preferably of 2 – 5 mg./ml. Thienyl acetic acid does not act as a substrate in its free acid form so that an active derivative thereof, such as an ester thereof with a lower alcohol, preferably methanol, is used. Generally, the thienyl acetic acid derivative is used in 2 – 20 molar excess, referred to the 7-ACA, the most preferable quantity being 5 – 10 molar excess. The reaction temperature used is generally 30°–45°C., preferably 35°–40°C. The pH of the reaction mixture is preferably maintained at pH 7 – 8. The reaction time varies, depending upon reaction conditions, between 1 – 10 hours, and it may be terminated when the highest production of cephalothin is achieved.

When acylating with the use of a solid phase enzyme preparation, the acylating enzyme is first adsorbed on a carrier. The acylation enzyme can be adsorbed by adding the culture filtrate of the acylation enzyme-producing strain to a carrier.

The carriers used according to the present invention is selected having regard to the characteristics of the carriers adsorbing the enzyme which do not inactivate the acylating enzyme activity; the absorbed enzyme must not be removed by washing; the carrier must be inert for each substrate and it must not adsorb the cephalothin. Examples of the carriers which are advantageously used for adsorbing an aqueous enzyme solution include active alumina, diatomaceous earth, active clay, calcium phosphate, hydroxyapatite and the like.

It is recommended first to adjust the pH to a stable pH for the acylating enzyme when adsorbing the enzyme on a carrier. The adsorption operation can be carried out batchwise or in a column, the latter being preferable for a continuous enzyme reaction. The amount of carrier used varies with the volume of the culture filtrate, the enzyme potency and the adsorption ratio of the carrier. Generally, in the case of a batch type adsorption, the amount of carrier is 5 – 15 w/v for culture filtrates. In the case of a column type operation, a column packed with carrier is wetted with water or buffer solution having the optimum pH for the enzyme, passing through the cultured broth or enzyme solution and thereafter washing the column with water or buffer solution in order to obtain the column type solid phase enzyme preparation.

The carrier containing adsorbed acylating enzyme, i.e., a solid phase enzyme preparation, may become denatured or lose its activity if it becomes too dry. Therefore, it should be kept moist.

The 7-ACA is then reacted with thienyl acetic acid with a derivative thereof in the presence of a solid phase enzyme preparation. Since the concentration of substrate may vary mainly according to the enzyme potency or rate of flow through the column, it should preferably be determined so that there is no unreacted 7-ACA or thienyl acetic acid in an eluate. The acylating reaction should be carried out at the optimum pH and temperature for the enzyme activity. The reaction time in the case of a column type operation can be adjusted by changing the effluent volume of the substrate. Usually, the reaction can be carried out by passage through a column of a solid phase enzyme preparation and contimuous operation can easily be carried out by continuously adding teh substrates. If, however, the substrates are found in the effluent, the effluent rate should be reduced or the effluent should be recycled through the column. These processes can be systematized as an automatic controlled plant systems. When the activity of the enzyme decreases or is lost, the operation should, of course, be terminated.

The cephalothin produced is separated by known isolation procedures.

Assay of cephlothin:

A test solution containing cephalothin is microbiologically assayed by the paper-disc method or by the cup method, using Bacillus subtilis PCI-219, for 16 hours at 37°C. The resulting inhibition zone is a measure of the potency of cepahtothin and is calculated by reference to a standard curve for cephalothin.

The following Examples are given for the purpose of illustrating the present invention:

Example 1

100 ml. of aqueous medium (pH 7.0) containing 1percent polypeptone, 1percent meat extract and 0.5percent sodium chloride were sterilised at 120°C. for 20 minutes in a 500 ml. flask.

Bacillus megaterium B-400 NRRL B-5385 was inoculated therein and reciprocally shake cultured at 30°C. for 48 hours. The cultured filtrate was adjusted to pH 7.5 and 1 g. of celite (product of Johns-Manville Sales Inc. U.S.A.) was added therein and stirred for 30 minutes. The filtered carrier was washed with 0.1 mole phosphate buffer (pH 7.5) and then mixture of 2.5 ml. of 0.5percent 7-ACA aqueous solution, 2.5 ml. of 2-thienyl acetic acid methyl ester and 7.5 ml. of 0.1 mole phosphate buffer (pH 7.5) were added thereto and stirred for 30 minutes at 37°C. After reaction, the carrier was separated and the filtrate was checked by silica gel thin layer chromatography showing a spot of Rf 0.54 using a developer benzeneacetone-acetic acid (40 : 56 : 4) which was identical with the authentic sample of cephalothin. Ratio of cephalothin formation was 75 percent.

Example 2

4 l. of culture filtrate obtained by substantially the same procedure as described in Example 1 were adjusted at pH 7.5, adding 40 g. of celite and stirred for 30 minutes. The said carrier was packed in a column (diameter 2.0 cm.) attached with a outer jacket, washed with 0.1 mole phosphate buffer (pH 7.5) and passed through the 480 ml. of 0.1 mole phosphate buffer (pH 7.5) containing 0.25 percent of 7-ACA and 2.5 percent of 2-thienyl acetic acid methyl ester within 30 minutes. The eluate was concentrated up to 1/10 volume, adjusted at pH 2 and extracted with ethyl acetate. Ethyl acetate layer was washed with water and saturated aqueous sodium chloride, thereafter dehydrated with anhydrous sodium sulfate. After filtration, 3 ml. of ethyl acetate solution of 30 percent sodium 2-ethylhexanoate were added therein, then ice-cooled to precipitate the sodium salt of the product. The precipitate was washed with ethyl acetate and dried. Yield 1.0 g.

The infra red spectrum of the product was identical with the authentic sample of cephalothin sodium salt.

Example 3

600 l. of medium (pH 7.0), containing glucose 1 percent, peptone 1 percent, meat extract 1 percent and NaCl 0.5 percent was inoculated with 30 l. of seed culture of Bacillus megaterium B-400 NRRL B-5385 and submerged cultured with aeration for 72 hours at 26°C. After fermentation, 580 l. of culture filtrate were obtained by centrifugation. The filtrate was adjusted to pH 7.5 and therein added 6 kg. of celite, stirred for 40 minutes thereafter. The enzyme adsorbed carrier was packed into a column (diameter 12 cm.) with outer jacket. The column was washed with 0.1 mole phosphate buffer pH 7.5 and passed through the mixed solution containing 1 kg. of 7-ACA (10 mg./ml), 15 l. of 2-thienyl acetic acid methyl ester and 100 l. of 0.1 mole phosphate buffer (pH 7.5), with a specific velocity (sv) 0.5. The eluate was twice washed with 20 l. of ethyl acetate and the celite column was also washed with 15 l. of ethyl acetate. The ethyl acetate was discarded and aqueous layer was adjusted to pH 1 - 2 with adding 6 N-HCl solution. The said aqueous layer was again extracted twice with 20 l. of ethyl acetate and dried up in vacuo to obtain 1.86 kg. of crude cephalothin (purity 80 percent): overall yield 96 percent. The crude product was recrystallized to obtain 1.34 kg. of the crystal (purity 98 percent; total yield 85 percent.

Having described our invention, we claim:

1. A process for the production of cephalothin, which comprises reacting 7-amino cephalosporanic acid with 2-thienyl acetic acid ester in an aqueous medium in the presence of an amino group acylating enzyme for 7-ACA derived from Bacillus megaterium NRRL B-5385.

2. A process according to claim 1 wherein the acylating enzyme is cultured broth of said Bacillus megaterium, culture filtrate thereof or enzyme prepared therefrom.

3. A process according to claim 1 wherein the acylating enzyme is an insolubilized enzyme preparation.

4. A process according to claim 3 wherein the insolubilized enzyme preparation is a carrier adsorbed with cultured broth of Bacillus megaterium NRRL B-5385, with culture filtrate thereof or with the acylating enzyme prepared therefrom.

5. A process according to claim 4 wherein the carrier is selected from the group consisting of diatomaceous earth, active clay, alumina, calcium phosphate and hydroxyapatite.

6. A process according to claim 1 wherein the reaction is carried out at 35° - 40°C., at pH 7 - 8, with a concentration of 7-amino cephalosporanic acid of 0.1 - 20 mg./ml., and a concentration of 2-thienyl acetic acid ester in 5 - 10 molar excess relative to the 7-amino cephalosporanic acid.

* * * * *